US012647478B2

(12) United States Patent (10) Patent No.: US 12,647,478 B2
Ye et al. (45) Date of Patent: Jun. 2, 2026

(54) COMPUTING NODE MANAGEMENT SYSTEM AND METHOD FOR MANAGING A PLURALITY OF COMPUTING NODES

(71) Applicant: Huawei Cloud Computing Technologies Co., Ltd., Guizhou (CN)

(72) Inventors: Chuan Ye, Hangzhou (CN); Jinsong Liu, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 38 days.

(21) Appl. No.: 18/488,687

(22) Filed: Oct. 17, 2023

(65) Prior Publication Data

US 2024/0048612 A1 Feb. 8, 2024

Related U.S. Application Data

(63) Continuation of application No. PCT/CN2022/087251, filed on Apr. 16, 2022.

(30) Foreign Application Priority Data

Apr. 17, 2021 (CN) .......................... 202110414830.9
May 12, 2021 (CN) .......................... 202110517965.8

(51) Int. Cl.
H04L 67/1031 (2022.01)
G06F 9/50 (2006.01)
G06F 13/40 (2006.01)
H04L 67/1097 (2022.01)

(52) U.S. Cl.
CPC ...... H04L 67/1031 (2013.01); G06F 13/4022 (2013.01); H04L 67/1097 (2013.01); G06F 9/5077 (2013.01)

(58) Field of Classification Search
CPC .. G06F 3/067; G06F 2209/509; G06F 9/5077; G06F 9/505; G06F 9/5027; G06F 13/4022; G06F 9/5072; G06F 9/54; H04L 67/1031; H04L 67/1097; H04L 41/0826; H04L 41/40; H04L 67/59; H04L 12/12; H04L 67/10; H04L 41/042
See application file for complete search history.

(56) References Cited

U.S. PATENT DOCUMENTS

| | | | | |
|---|---|---|---|---|
| 6,209,050 B1 * | 3/2001 | Iho | ....................... | G06F 13/4068 |
| | | | | 713/1 |
| 6,654,830 B1 * | 11/2003 | Taylor | ................... | G06F 3/0661 |
| | | | | 709/213 |
| 8,069,293 B1 * | 11/2011 | Rogan | ................... | G06F 13/385 |
| | | | | 370/254 |
| 9,396,023 B1 * | 7/2016 | Trivedi | .................... | G06F 9/54 |
| 9,411,623 B1 * | 8/2016 | Ryan | ................... | G06F 9/45558 |
| 11,467,636 B1 * | 10/2022 | Rivnay | ..................... | G06F 1/20 |

(Continued)

*Primary Examiner* — Faisal M Zaman
(74) *Attorney, Agent, or Firm* — Conley Rose, P.C.

(57) ABSTRACT

A computing node management system includes a central offload node and a plurality of computing nodes. A riser card is inserted into each computing node. Each riser card is connected to the central offload node. Each riser card establishes a communication channel between the central offload node and the computing node into which the riser card is inserted. The central offload node is configured to provide resources for the plurality of computing nodes through the communication channels.

20 Claims, 6 Drawing Sheets

(56) References Cited

U.S. PATENT DOCUMENTS

| | | | | |
|---|---|---|---|---|
| 11,829,792 | B1* | 11/2023 | Chandrashekar | G06F 9/45558 |
| 2002/0083117 | A1* | 6/2002 | Goddard | H04L 9/40 718/103 |
| 2002/0108008 | A1* | 8/2002 | Park | G06F 1/184 710/300 |
| 2003/0110351 | A1* | 6/2003 | Blood | G06F 3/0607 711/111 |
| 2007/0162912 | A1* | 7/2007 | Kilian | G06F 9/5061 719/313 |
| 2008/0155223 | A1* | 6/2008 | Hiltgen | G06F 21/6218 718/1 |
| 2010/0131669 | A1* | 5/2010 | Srinivas | G06F 9/452 709/233 |
| 2010/0312982 | A1* | 12/2010 | Ichikawa | G06F 9/45558 718/1 |
| 2011/0119668 | A1* | 5/2011 | Calder | G06F 3/0661 718/1 |
| 2012/0254353 | A1* | 10/2012 | Baba | H04L 12/4641 709/217 |
| 2013/0010419 | A1* | 1/2013 | Armstrong | H04L 41/0668 361/679.02 |
| 2014/0195676 | A1* | 7/2014 | Hirata | H04L 63/0236 709/224 |
| 2014/0223576 | A1* | 8/2014 | Zhao | H04L 67/10 726/27 |
| 2015/0052215 | A1* | 2/2015 | Luna | H04L 67/566 709/213 |
| 2015/0143543 | A1* | 5/2015 | Phegade | H04W 4/80 726/29 |
| 2015/0234612 | A1* | 8/2015 | Himelstein | G06F 13/00 714/6.21 |
| 2016/0065659 | A1* | 3/2016 | Bloch | G06F 9/546 709/201 |
| 2016/0380865 | A1* | 12/2016 | Dubal | H04L 43/026 709/224 |
| 2017/0031620 | A1* | 2/2017 | Yu | G06F 3/0625 |
| 2018/0018199 | A1* | 1/2018 | Innes | G06F 11/203 |
| 2018/0101324 | A1* | 4/2018 | Sharma | G06F 16/29 |
| 2019/0068456 | A1* | 2/2019 | Lotfi | G06F 9/5077 |
| 2019/0392150 | A1 | 12/2019 | Shevade et al. | |
| 2020/0244623 | A1* | 7/2020 | Zhang | H04L 45/66 |
| 2020/0272502 | A1* | 8/2020 | Hiltgen | G06F 9/45558 |
| 2020/0351347 | A1* | 11/2020 | Chang | G06F 9/5083 |
| 2021/0064561 | A1* | 3/2021 | Raman | G06F 13/128 |
| 2021/0084749 | A1* | 3/2021 | Devalla | H05K 1/144 |
| 2022/0026965 | A1* | 1/2022 | Chen | H05K 7/20145 |
| 2022/0206962 | A1* | 6/2022 | Kim | G06F 13/102 |

* cited by examiner

COMPUTING NODE MANAGEMENT SYSTEM AND METHOD FOR MANAGING A PLURALITY OF COMPUTING NODES

CROSS-REFERENCE TO RELATED APPLICATIONS

This is a continuation of Int'l Patent App. No. PCT/CN2022/087251, filed on Apr. 16, 2022, which claims priority to Chinese Patent Application No. 202110414830.9, filed on Apr. 17, 2021, and Chinese Patent Application No. 202110517965.8, filed on May 12, 2021, which are incorporated by reference.

FIELD

This disclosure relates to the field of cloud technologies, and in particular, to a computing node management system and a method for managing a plurality of computing nodes.

BACKGROUND

As rapid development of cloud technologies, cloud vendors begin to turn to hardware research and development. Based on this, an era in which the cloud vendors define cloud hardware has begun. By inserting an offload card (for example, a smart card) into a computing node (a server) on which a cloud instance is running, a cloud management function of the computing node may be offloaded to the offload card for implementation, to reduce load of the computing node.

For a plurality of computing nodes in a same subrack, an offload card is inserted into each computing node, and the offload card manages a cloud instance running on the computing node. However, load (for example, a quantity of running cloud instances) on different computing nodes is different, while resource specifications of offload cards customized by a cloud vendor for these computing nodes are usually the same. As a result, different offload cards on different computing nodes may have different working load. Some offload cards may have remaining resources, and some offload cards may have insufficient resources.

Therefore, when the preceding situation occurs, the cloud vendor may design offload cards of different resource specifications for different computing nodes, but huge costs are to be paid.

SUMMARY

Embodiments of this disclosure provide a computing node management system and a method for managing a plurality of computing nodes, to reduce costs to be paid by a cloud vendor.

A first aspect of this disclosure provides a computing node management system. The system includes a central offload node and a plurality of computing nodes. A riser card is inserted into each computing node. Each riser card is connected to the central offload node. Each riser card establishes a communication channel between the central offload node and the computing node into which the riser card is inserted. In other words, each riser card may be used as a communication channel between the central offload node and the computing node into which the riser card is inserted.

For any computing node, the riser card may establish a communication channel between the computing node and the central offload node. The central offload node may provide resources for the computing node through the communication channel between the computing node and the central offload node. In other words, the riser card establishes a communication channel between the computing node and the central offload node to implement an information transfer function. A resource specification of a universal riser card formulated by a cloud vendor is sufficient to support the simple function. It can be learned that in this solution, even if load of different computing nodes is different, resource specifications of riser cards inserted into the different computing nodes may be the same, and the cloud vendor does not need to design riser cards of different resource specifications for the different computing nodes.

In a possible implementation, the communication channel includes an inter-node communication sub-channel and an intra-node communication sub-channel. The inter-node communication sub-channel is provided between the riser card and the central offload node. The intra-node communication sub-channel is provided between the riser card and the computing node into which the riser card is inserted.

In a possible implementation, the resource allocated by the central offload node includes a storage resource. The central offload node is connected to a storage device that provides the storage resource. For example, the storage device may be integrated inside the central offload node. For another example, the storage device may be connected to the central offload node through a disk interface, a serial advanced technology attachment (SATA) interface, an integrated drive electronics (IDE) interface, or the like. For still another example, the storage device is remotely connected to the offload node through a network. A first virtual device is deployed on a first riser card in the plurality of riser cards. A first cloud instance in a first computing node into which the first riser card is inserted is bound to the first virtual device (for example, an operating system of the first riser card mounts a virtual function of the first riser card to an operating system of the first cloud instance). The central offload node allocates, to the first virtual device through a first inter-node communication sub-channel, the storage resource of the storage device connected to the central offload node. The first cloud instance accesses, through a first intra-node communication sub-channel, the first virtual device to which the storage resource is allocated. In the foregoing implementation, the first virtual device is deployed on the first riser card inserted into the first computing node. The first cloud instance on the first computing node is bound to the first virtual device. The first cloud instance communicates with the first virtual device through the first intra-node communication sub-channel. The first virtual device communicates with the central offload node through the first inter-node communication sub-channel. Therefore, the central offload node may allocate the storage resource of the storage device connected to the central offload node to the first virtual device, so that the first cloud instance uses the storage resource through the first virtual device.

In a possible implementation, the storage device may be, for example, a disk, and the storage resource may be, for example, a logical disk in the disk.

In a possible implementation, the central offload node is further configured to forward an input/output (IO) request between the storage device and the first cloud instance. In the foregoing implementation, when the first cloud instance of the first computing node implements a data read/write operation, a corresponding IO request may be generated, and the IO request is sent to the central offload node through the first riser card inserted into the first computing node. Then, the central offload node sends the IO request to the storage device, so that the storage device implements the data read/write operation based on the IO request.

In a possible implementation, the central offload node is further configured to perform processing on the IO request, and the processing includes at least one of the following: data encryption and decryption, data verification, data transmission speed control, and data quality-of-service control. In the foregoing implementation, the central offload node may further implement an information processing function. The central offload node may perform operations such as data encryption and decryption, data verification, data transmission speed control, and data quality-of-service control on the IO request forwarded by the central offload node, to improve security and reliability of information transmission and ensuring end-to-end communication quality.

In a possible implementation, the resource allocated by the central offload node includes a computing resource. The central offload node is connected to a computing device that provides the computing resource. A second virtual device is deployed on a second riser card in the plurality of riser cards. A second cloud instance in a second computing node into which the second riser card is inserted is bound to the second virtual device. The central offload node allocates, to the second virtual device through a second inter-node communication sub-channel, the computing resource of the computing device connected to the central offload node. The second cloud instance accesses, through a second intra-node communication sub-channel, the second virtual device to which the computing resource is allocated. In the foregoing implementation, the second virtual device is deployed on the second riser card inserted into the second computing node. The second cloud instance on the second computing node is bound to the second virtual device. The second cloud instance communicates with the second virtual device through the second intra-node communication sub-channel. The second virtual device communicates with the central offload node through the second inter-node communication sub-channel. Therefore, the central offload node may allocate the computing resource of the computing device connected to the central offload node to the second virtual device, so that the second cloud instance uses the computing resource through the second virtual device.

In a possible implementation, the computing device is a processor configured for heterogeneous computing. For example, a graphics processing unit (GPU) or a tensor processing unit (TPU) that is configured for image rendering or machine learning, a field programmable gate array (FPGA), an encryption card, a decryption card, or a universal serial bus (USB) device that implements a specific function. The computing resource may, for example, provide a computing capability for these devices.

In a possible implementation, the resource allocated by the central offload node includes a network resource. The central offload node is connected to a network device that provides the network resource. A third virtual device is deployed on a third riser card in the plurality of riser cards. A third cloud instance in a third computing node into which the third riser card is inserted is bound to the third virtual device. The central offload node allocates, to the third virtual device through a third inter-node communication sub-channel, the network resource of the network device connected to the central offload node. The third cloud instance accesses, through a third intra-node communication sub-channel, the third virtual device to which the network resource is allocated. In the foregoing implementation, the third virtual device is deployed on the third riser card inserted into the third computing node. The third cloud instance on the third computing node is bound to the third virtual device. The third cloud instance communicates with the third virtual device through the third intra-node communication sub-channel. The third virtual device communicates with the central offload node through the third inter-node communication sub-channel. Therefore, the central offload node may allocate the network resource of the network device connected to the central offload node to the third virtual device, so that the third cloud instance uses the network resource through the third virtual device.

In a possible implementation, the network device is, for example, a gateway, a network adapter, or a router, and the network resource may be, for example, a network function provided by a gateway, a network adapter, or a router. The gateway may be a domain name system (DNS) gateway, a network address translation (NAT) gateway, a load balancing gateway, or the like.

Optionally, the computing device and the network device may also be integrated inside the central offload node.

In a possible implementation, the central offload node is further configured to forward a network packet between the network device and the third cloud instance. In the foregoing implementation, the central offload node is further connected to the network device. When the third cloud instance of the third computing node communicates with an external network, a corresponding network packet may be generated, and the network packet is sent to the central offload node through the third riser card inserted into the third computing node. Then, the central offload node sends the network packet to the network device, so that the network device sends the network packet to the external network, and a response packet may be returned to the third cloud instance of the third computing node along an original path through the central offload node.

In a possible implementation, the central offload node is further configured to forward network packets between cloud instances on the plurality of computing nodes. In the foregoing implementation, the central offload node may be used as a communication bridge between the cloud instances on the plurality of computing nodes, and forward the network packets between the cloud instances, so that communication is implemented between the cloud instances on different computing nodes.

In a possible implementation, the central offload node is further configured to perform processing on the network packet, and the processing includes at least one of the following: data encryption and decryption, data verification, data transmission speed control, and data quality-of-service control. In the foregoing implementation, the central offload node may further implement an information processing function. The central offload node may perform operations such as data encryption and decryption, data verification, data transmission speed control, and data quality-of-service control on the network packet forwarded by the central offload node, to improve security and reliability of information transmission and ensuring end-to-end communication quality.

In a possible implementation, the central offload node is configured to manage cloud instances on the plurality of computing nodes through the communication channels. In the foregoing implementation, the central offload node may perform the following cloud instance management operations: notifying the computing nodes to create the cloud instances, notifying the computing nodes to release the cloud instances, notifying the computing nodes to migrate the cloud instances, and notifying the computing nodes to monitor statuses of the cloud instances.

In a possible implementation, the resource allocated by the central offload node includes a storage resource. The central offload node is connected to a storage device that provides the storage resource. For example, the storage device may be integrated inside the central offload node. For another example, the storage device may be connected to the central offload node through a disk interface, an SATA interface, an IDE interface, or the like. For still another example, the storage device is remotely connected to the offload node through a network. A first virtual device is deployed on a first riser card in the plurality of riser cards. A first computing node into which the first riser card is inserted is bound to the first virtual device. The central offload node allocates, to the first virtual device through a first inter-node communication sub-channel, the storage resource of the storage device connected to the central offload node. The first computing node accesses, through a first intra-node communication sub-channel, the first virtual device to which the storage resource is allocated. In the foregoing implementation, the first virtual device is deployed on the first riser card inserted into the first computing node. The first computing node is bound to the first virtual device. The first computing node communicates with the first virtual device through the first intra-node communication sub-channel. The first virtual device communicates with the central offload node through the first inter-node communication sub-channel. Therefore, the central offload node may allocate the storage resource of the storage device connected to the central offload node to the first virtual device, so that the first computing node uses the storage resource through the first virtual device.

In a possible implementation, the storage device may be, for example, a disk, and the storage resource may be, for example, a logical disk in the disk.

In a possible implementation, the central offload node is further configured to forward an IO request between the storage device and the first computing node. In the foregoing implementation, when the first computing node implements a data read/write operation, a corresponding IO request may be generated, and the IO request is sent to the central offload node through the first riser card inserted into the first computing node. Then, the central offload node sends the IO request to the storage device, so that the storage device implements the data read/write operation based on the IO request.

In a possible implementation, the central offload node is further configured to perform processing on the IO request, and the processing includes at least one of the following: data encryption and decryption, data verification, data transmission speed control, and data quality-of-service control. The central offload node may perform operations such as data encryption and decryption, data verification, data transmission speed control, and data quality-of-service control on the IO request forwarded by the central offload node, to improve security and reliability of information transmission and ensuring end-to-end communication quality.

In a possible implementation, the resource includes a computing resource. The central offload node is connected to a computing device that provides the computing resource. A second virtual device is deployed on a second riser card in the plurality of riser cards. A second computing node into which the second riser card is inserted is bound to the second virtual device. The central offload node allocates, to the second virtual device through a second inter-node communication sub-channel, the computing resource of the computing device connected to the central offload node. The second computing node accesses, through a second intra-node communication sub-channel, the second virtual device to which the computing resource is allocated. In the foregoing implementation, the second virtual device is deployed on the second riser card inserted into the second computing node. The second computing node is bound to the second virtual device. The second computing node communicates with the second virtual device through the second intra-node communication sub-channel. The second virtual device communicates with the central offload node through the second inter-node communication sub-channel. Therefore, the central offload node may allocate the computing resource of the computing device connected to the central offload node to the second virtual device, so that the second computing node uses the computing resource through the second virtual device.

In a possible implementation, the computing device is a processor configured for heterogeneous computing. For example, a GPU or a TPU that is configured for image rendering or machine learning, an FPGA, an encryption card, a decryption card, or a USB device that implements a specific function. The computing resource may, for example, provide a computing capability for these devices.

In a possible implementation, the resource includes a network resource. The central offload node is connected to a network device that provides the network resource. A third virtual device is deployed on a third riser card in the plurality of riser cards. The third computing node into which the third riser card is inserted is bound to the third virtual device. The central offload node allocates, to the third virtual device through a third inter-node communication sub-channel, the network resource of the network device connected to the central offload node. The third computing node accesses, through a third intra-node communication sub-channel, the third virtual device to which the network resource is allocated. In the foregoing implementation, the third virtual device is deployed on the third riser card inserted into the third computing node. The third computing node is bound to the third virtual device. The third computing node communicates with the third virtual device through the third intra-node communication sub-channel. The third virtual device communicates with the central offload node through the third inter-node communication sub-channel. Therefore, the central offload node may allocate the network resource of the network device connected to the central offload node to the third virtual device, so that the third computing node uses the network resource through the third virtual device.

In a possible implementation, the network device is, for example, a gateway, a network adapter, or a router, and the network resource may be, for example, a network function provided by a gateway, a network adapter, or a router. The gateway may be a DNS gateway, a NAT gateway, a load balancing gateway, or the like.

In a possible implementation, the central offload node is further configured to forward a network packet between the network device and the third computing node. In the foregoing implementation, the central offload node is further connected to the network device. When the third computing node communicates with an external network, a corresponding network packet may be generated, and the network packet is sent to the central offload node through the third riser card inserted into the third computing node. Then, the central offload node sends the network packet to the network device, so that the network device sends the network packet to the external network, and a response packet may be returned to the third computing node along an original path through the central offload node.

In a possible implementation, the central offload node is further configured to forward network packets between the plurality of computing nodes. In the foregoing implementation, the central offload node may be used as a communication bridge between the plurality of computing nodes, and forward the network packets between the computing nodes, so that communication is implemented between different computing nodes.

In a possible implementation, the central offload node is further configured to perform processing on the network packet, and the processing includes at least one of the following: data encryption and decryption, data verification, data transmission speed control, and data quality-of-service control. In the foregoing implementation, the central offload node may further implement an information processing function. The central offload node may perform operations such as data encryption and decryption, data verification, data transmission speed control, and data quality-of-service control on the network packet forwarded by the central offload node, to improve security and reliability of information transmission and ensuring end-to-end communication quality.

In a possible implementation, the central offload node is configured to manage the plurality of computing nodes through the communication channels.

In a possible implementation, the inter-node communication sub-channels are implemented by using a high-speed communication bus. The high-speed communication bus is any one of the following: a Peripheral Component Interconnect Express (PCIE) bus, a serializer/deserializer (SERDES) bus, a RDMA over Converged Ethernet (RoCE) bus, and a remote direct memory access (RDMA) bus.

In a possible implementation, the intra-node communication sub-channels are implemented by using a PCIE bus.

In a possible implementation, a cloud service system may include at least one subrack. Each subrack includes a group of computing nodes, and at least one central offload node configured to manage the group of computing nodes.

In a possible implementation, a cloud service system may include a plurality of subracks. Each subrack includes a group of computing nodes. Each group of computing nodes is managed by a same central offload node.

In a possible implementation, the central offload node is a server or an offload card.

In a possible implementation, the cloud instances are virtual machines or containers.

A second aspect of this disclosure provides a method for managing a plurality of computing nodes. The method is applied to a central offload node. A riser card is inserted into each of the plurality of computing nodes. Each riser card is connected to the central offload node. Each riser card establishes a communication channel between the central offload node and the computing node into which the riser card is inserted. The method includes: The central offload node provides resources for the plurality of computing nodes through the communication channels. The central offload node separately manages the plurality of computing nodes through the communication channels.

A computing node management system for implementing the foregoing method includes a central offload node and a plurality of computing nodes. A riser card is inserted into each computing node. Each riser card is connected to the central offload node. Each riser card establishes a communication channel between the central offload node and the computing node into which the riser card is inserted. For any computing node, the central offload node may provide resources for the computing node and manage the computing node through a riser card inserted into the computing node. It can be learned that the riser cards establishes the communication channels between the computing nodes and the central offload node, and the riser cards implements an information transfer function. Therefore, when load on different computing nodes is different, even if resource specifications of riser cards inserted into the different computing nodes are the same, functions that are implemented by the riser cards can be fully supported. A cloud vendor does not need to design riser cards of different resource specifications for the different computing nodes, and this helps reduce costs.

In a possible implementation, the communication channel includes an inter-node communication sub-channel and an intra-node communication sub-channel. The inter-node communication sub-channel is provided between the riser card and the central offload node. The intra-node communication sub-channel is provided between the riser card and the computing node into which the riser card is inserted.

In a possible implementation, the resource allocated by the central offload node includes a storage resource. The central offload node is connected to a storage device that provides the storage resource. A first virtual device is deployed on a first riser card in the plurality of riser cards. A first computing node into which the first riser card is inserted or a first cloud instance running on the first computing node is bound to the first virtual device through a first intra-node communication sub-channel. That the central offload node provides resources for the plurality of computing nodes through the communication channels includes: The central offload node allocates, to the first virtual device through a first inter-node communication sub-channel, the storage resource of the storage device connected to the central offload node.

In a possible implementation, the method further includes: The central offload node forwards an IO request between the storage device and the first cloud instance.

In a possible implementation, the method further includes: The central offload node forwards an IO request between the storage device and the first computing node.

In a possible implementation, the method further includes: The central offload node performs processing on the IO request, and the processing includes at least one of the following: data encryption and decryption, data verification, data transmission speed control, and data quality-of-service control.

In a possible implementation, the resource allocated by the central offload node includes a computing resource. The central offload node is connected to a computing device that provides the computing resource. A second virtual device is deployed on a second riser card in the plurality of riser cards. A second computing node into which the second riser card is inserted or a second cloud instance running on the second computing node is bound to the second virtual device through a second intra-node communication sub-channel. That the central offload node provides resources for the plurality of computing nodes through the communication channels includes: The central offload node allocates, to the second virtual device through a second inter-node communication sub-channel, the computing resource of the computing device connected to the central offload node.

In a possible implementation, the resource allocated by the central offload node includes a network resource. The central offload node is connected to a network device that provides the network resource. A third virtual device is deployed on a third riser card in the plurality of riser cards. A third computing node into which the third riser card is inserted or a third cloud instance running on the third computing node is bound to the third virtual device through a third intra-node communication sub-channel. That the central offload node provides resources for the plurality of computing nodes through the communication channels includes: The central offload node allocates, to the third virtual device through a third inter-node communication sub-channel, the network resource of the network device connected to the central offload node.

In a possible implementation, the method further includes: The central offload node forwards a network packet between the network device and the third cloud instance.

In a possible implementation, the method further includes: The central offload node forwards a network packet between the network device and the third computing node.

In a possible implementation, the method further includes: The central offload node forwards network packets between cloud instances on the plurality of computing nodes.

In a possible implementation, the method further includes: The central offload node forwards network packets between the plurality of computing nodes.

In a possible implementation, the method further includes: The central offload node performs processing on the network packet, and the processing includes at least one of the following: data encryption and decryption, data verification, data transmission speed control, and data quality-of-service control.

In a possible implementation, the inter-node communication sub-channels are implemented by using a high-speed communication bus. The high-speed communication bus is any one of the following: a PCIE bus, an SERDES bus, a RoCE bus, and a RDMA bus.

In a possible implementation, the intra-node communication sub-channels are implemented by using a PCIE bus.

In a possible implementation, a cloud service system may include at least one subrack. Each subrack includes a group of computing nodes, and at least one central offload node configured to manage the group of computing nodes.

In a possible implementation, a cloud service system may include a plurality of subracks. Each subrack includes a group of computing nodes. Each group of computing nodes is managed by a same central offload node.

In a possible implementation, the central offload node is a server or an offload card.

In a possible implementation, the cloud instances are virtual machines or containers.

A third aspect of this disclosure provides a central offload node. The central offload node includes a memory and a processor.

The memory stores code. The processor is configured to execute the code. When the code is executed, the central offload node performs the method according to any one of the second aspect or the possible implementations of the second aspect.

A fourth aspect of this disclosure provides a computer storage medium. The computer storage medium stores a computer program. When the program is executed by a computer, the computer is enabled to perform the method according to any one of the second aspect or the possible implementations of the second aspect.

A fifth aspect of this disclosure provides a computer program product. The computer program product stores instructions. When the instructions are executed by a computer, the computer is enabled to perform the method according to any one of the second aspect or the possible implementations of the second aspect.

In embodiments of this disclosure, the computing node management system includes the central offload node and the plurality of computing nodes. The riser card is inserted into each computing node. Each riser card is connected to the central offload node. Each riser card establishes the communication channel between the central offload node and the computing node into which the riser card is inserted. For any computing node, the central offload node may provide the resources for the computing node and manage the computing node through a riser card inserted into the computing node. It can be learned that the riser cards establishes the communication channels between the computing nodes and the central offload node, and the riser cards implements the information transfer function. Therefore, when the load on the different computing nodes is different, even if the resource specifications of the riser cards inserted into the different computing nodes are the same, the functions that are implemented by the riser cards can be fully supported. A cloud vendor does not need to design the riser cards of different resource specifications for the different computing nodes, and this helps reduce costs.

DETAILED DESCRIPTION

Embodiments of this disclosure provide a computing node management system and a method for managing a plurality of computing nodes, to reduce costs to be paid by a cloud vendor.

In the specification, claims, and accompanying drawings, terms "first", "second", and the like are intended to distinguish between similar objects but do not necessarily indicate a specific order or sequence. It should be understood that the terms used in this way are interchangeable in proper cases, and this is merely a distinguishing manner used to describe objects with a same attribute. In addition, terms "include" and "contain" and any variations thereof are intended to cover non-exclusive inclusions so that a process, method, system, product, or device including a series of units is not necessarily limited to those units, but may include other units that are not explicitly listed or are inherent to such a process, method, product, or device.

Embodiments of this disclosure may be applied to a computing node management system. Currently, in a computing node management system, a cloud vendor inserts an offload card into a computing node (that is, a physical server) that a cloud instance is running on, so that the offload card replaces the computing node to implement cloud management. In other words, the offload card replaces the computing node to manage cloud instances on the computing node. In this way, load of the computing node is reduced.

Figure 1:
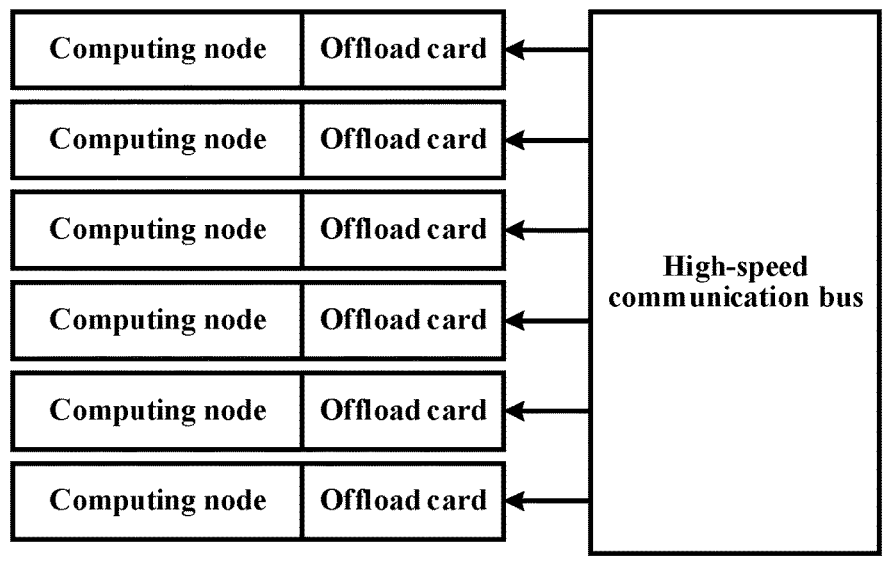
FIG. 1 is a schematic diagram of a structure of a computing node management system in a related technology.

As shown in FIG. 1 (which is a schematic diagram of a structure of a computing node management system in related technologies), a plurality of computing nodes are deployed in a subrack of the computing node management system. An offload card is inserted into each computing node, and the offload card manages a cloud instance running on the computing node. However, load on different computing nodes (for example, a quantity of the running cloud instances and a traffic volume of the cloud instances) is different, and resource specifications of offload cards customized by a cloud vendor for these computing nodes are usually the same. As a result, different offload cards on the different computing nodes may have different working load. Some offload cards may have remaining resources, and some offload cards may have insufficient resources.

Figure 2A:
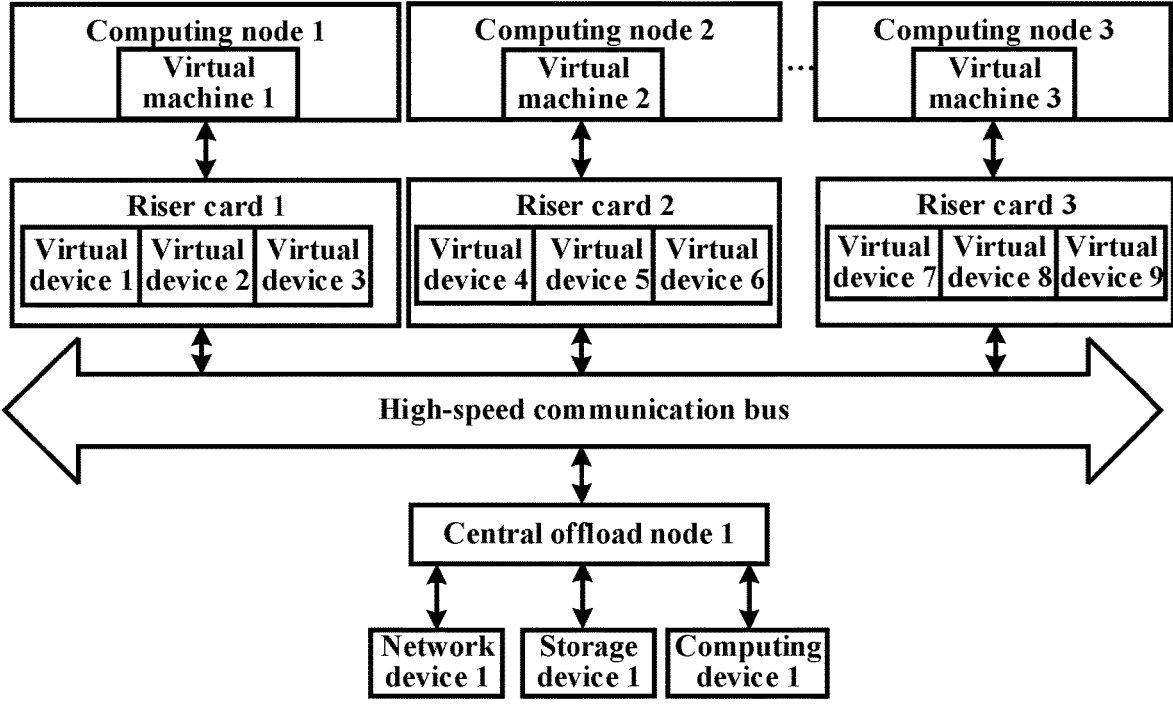
FIG. 2A is a schematic diagram of a structure of a computing node management system.
Figure 2B:
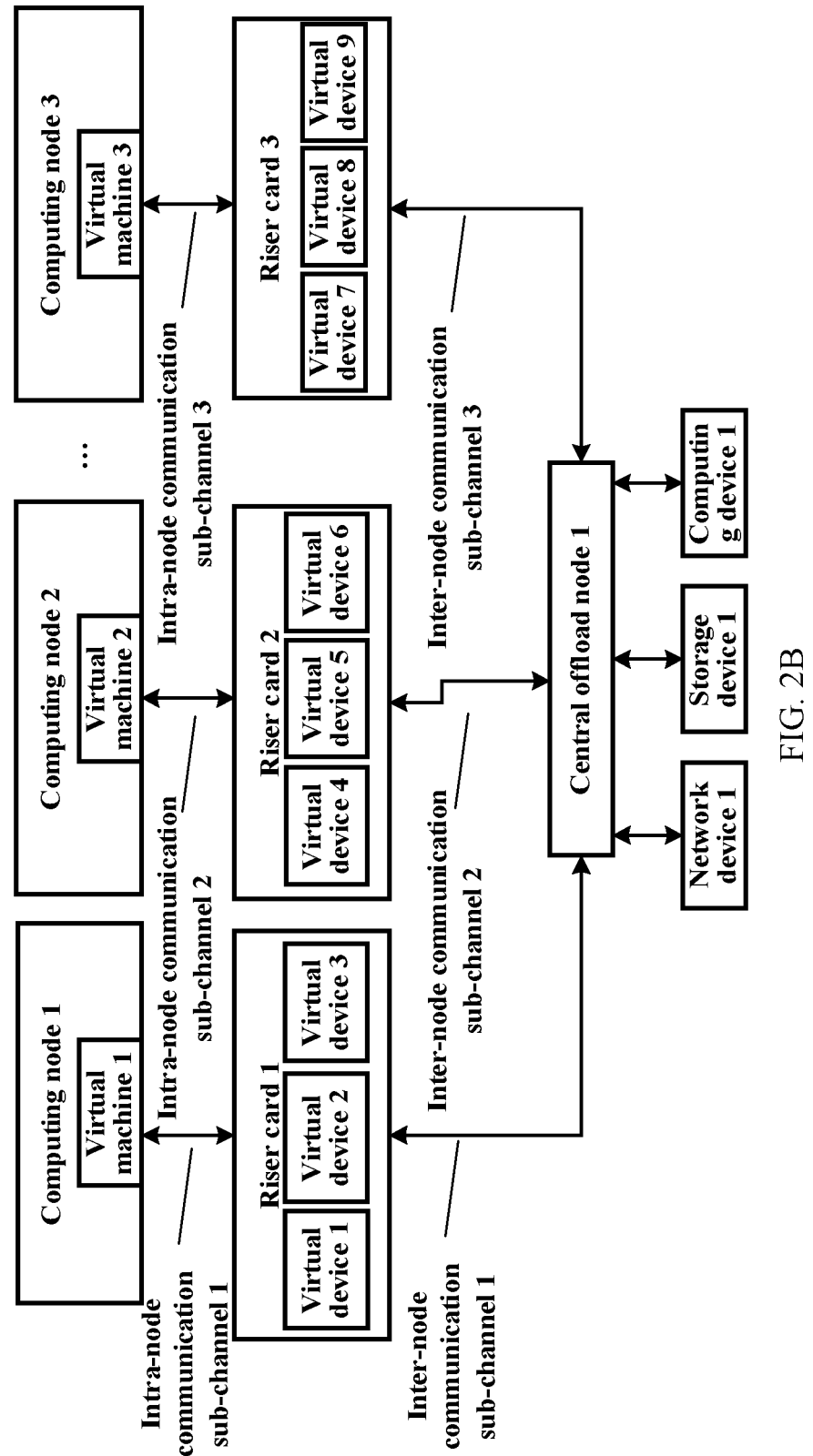
FIG. 2B is a schematic diagram of another structure of a computing node management system.

Therefore, when the preceding situation occurs, the cloud vendor may design offload cards of different resource specifications for different computing nodes, but huge costs are to be paid. To resolve this problem, the disclosure provides a new computing node management system. FIG. 2A is a schematic diagram of a structure of a computing node management system. FIG. 2B is a schematic diagram of a structure of a computing node management system. As shown in FIG. 2A and FIG. 2B, the system includes computing nodes, riser cards, and a central offload node. The following briefly describes the computing nodes, the riser cards, and the central offload node.

At least one cloud instance is usually deployed on the computing node, to provide a service for a user who has a cloud service requirement. A computing node generally refers to a physical server. A cloud instance of a computing node may be a virtual machine (VM) on a physical server, a container (docker) on a physical server, or the like. Alternatively, the cloud instance may not be deployed on the computing node, and the computing node is used as a bare metal (also called bare metal server, that is, the computing node) to provide a cloud service for a user who has a cloud service requirement (for example, a public cloud tenant or a private cloud user). In the computing node management system, a data center may include a plurality of subracks. A plurality of computing nodes may be placed in each subrack. The computing nodes in a same subrack are usually considered as a group of computing nodes.

The riser card may be presented in a manner of a heterogeneous card, for example, a simplified smart card, a graphics processing unit (GPU), a network interface controller (NIC), or the like. The riser card may also be presented by using a board that integrates a forwarding function and a virtualization function, for example, a single-root I/O virtualization (SRIOV) function. For example, an offload card may be formed by embedding a chip on a main board. The chip may be an application-specific integrated circuit (ASIC), a field-programmable gate array (FPGA), or the like. Interfaces are provided on two sides of the riser card, so that the riser card is disposed between the computing node and the central offload node. In other words, one side of the riser card is connected to the computing node, and the other side of the riser card is connected to the central offload node. In this way, the riser card may be used as a communication bridge (a communication channel) between the computing node and the central offload node, to implement information exchange between the computing node and the central offload node.

The riser card may support an SRIOV function. The riser card may create a virtual device, including at least one physical function (PF) and a plurality of virtual functions (VFs). For example, the riser card may create various types of virtual devices based on a virtio protocol, such as virtio-gpu, virtio-blk, virtio-scsi, virtio-net, virtio-vsock, and virtio-fs, and bind the virtual devices to the cloud instances of the computing nodes (or the computing nodes), so that the virtual devices are used as virtual IO interfaces between the cloud instances of the computing nodes (or the computing nodes) and the central offload node. In this way, communication between the cloud instances of the computing nodes (or the computing nodes) and the central offload node is implemented.

The central offload node may be a physical server, for example, a server based on an X86 architecture, a server based on an ARM architecture, or the like. The central offload node may also be independent embedded hardware customized by the cloud vendor, for example, an offload card that can provide a network resource, a storage resource, and a computing resource. The central offload node may provide the network resource, the storage resource, and the computing resource to the virtual devices of the riser cards. The cloud instances of the computing nodes (or the computing nodes) may use the virtual devices. Therefore, the central offload node may provide the computing resource, the network resource, and the storage resource for the cloud instances of the computing nodes (or the computing nodes). In this way, functions such as network packet processing, IO forwarding, cloud storage, and information processing are implemented.

Figure 3:
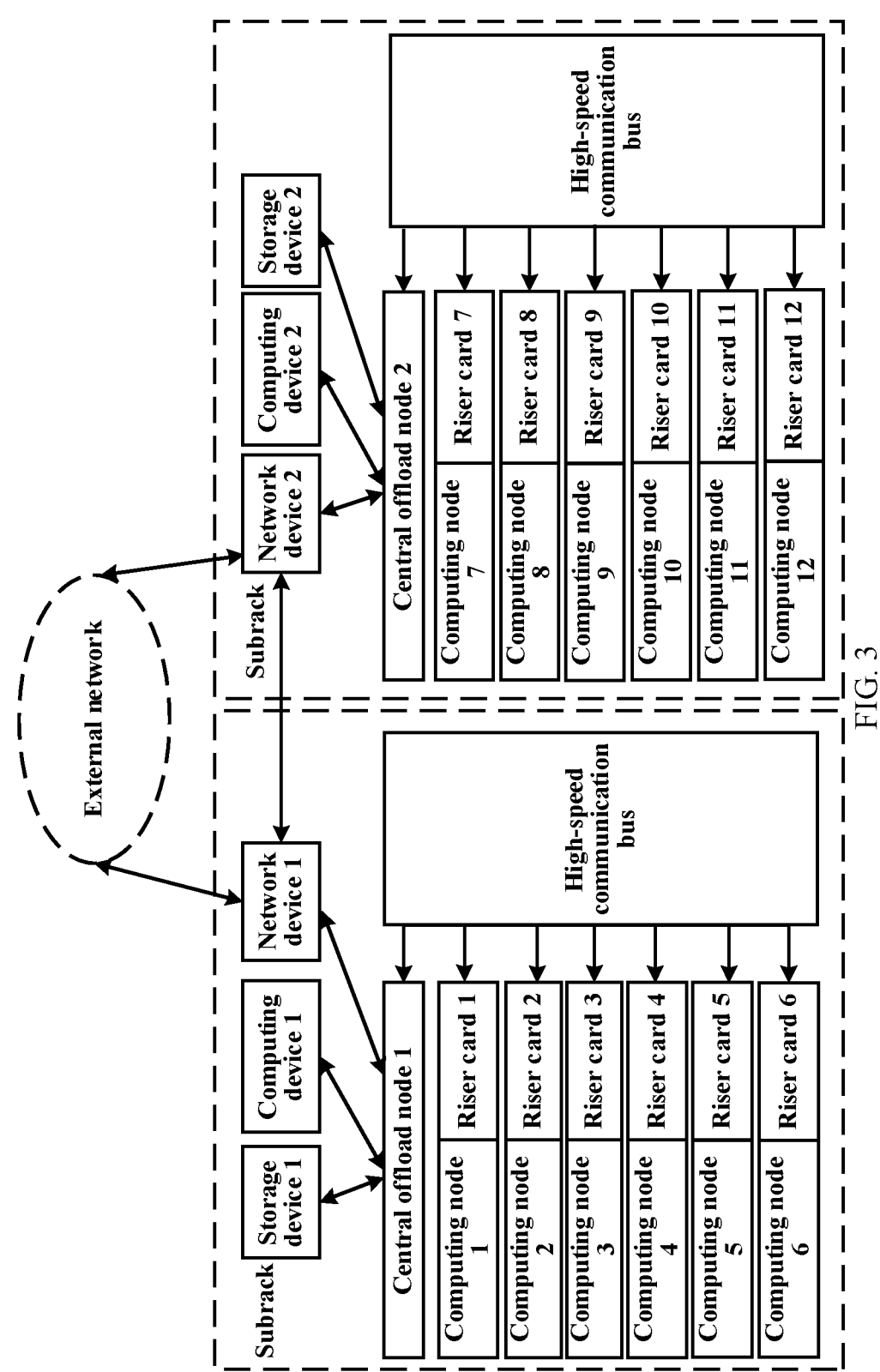
FIG. 3 is a schematic diagram of another structure of a computing node management system.

To further understand relationships among the computing nodes, the riser cards, and the central offload node, the following further describes the relationships among the computing nodes, the riser cards, and the central offload node with reference to FIG. 3. To facilitate the description of the relationships among the computing nodes, the riser cards, and the central offload node, the following uses an example in which cloud instances are deployed on computing nodes for description. If the computing nodes are presented in a bare metal manner, the relationships among the computing nodes, the riser cards, and the central offload node are similar. Details are not described again subsequently.

FIG. 3 is a schematic diagram of another structure of a computing node management system. It should be noted that the example shown in FIG. 3 is obtained by extending the example shown in FIG. 2B. As shown in FIG. 3, a subrack of the computing node management system includes a central offload node and a plurality of computing nodes. A riser card is inserted into each computing node. Each riser card is connected to the central offload node. Each riser card establishes a communication channel between the central offload node and the computing node into which the riser card is inserted. The communication channels include intra-node communication sub-channels between the riser cards and the computing nodes into which the riser cards are inserted, and inter-node communication sub-channels between the riser cards and the central offload node. In other words, for any riser card, the riser card may be used as a communication channel between the central offload node and a computing node into which the riser card is inserted. For ease of description, the following uses the example shown in FIG. 2B for schematic description. As shown in FIG. 2B, it is assumed that a subrack includes a computing node 1 into which a riser card 1 is inserted, a computing node 2 into which a riser card 2 is inserted, and a central offload node 1. The riser card 1 may be used as a communication channel between the computing node 1 and the central offload node 1. The riser card 2 may be used as a communication channel between the computing node 2 and the central offload node 1. In other words, the central offload node 1 may communicate with the computing node 1 through the riser card 1, and the central offload node 1 may communicate with the computing node 2 through the riser card 2.

For any computing node, the computing node has a PCIE interface, and a riser card allocated to the computing node also has a PCIE interface. Therefore, the PCIE interface of the computing node is connected to the PCIE interface of the riser card allocated to the computing node. The PCIE interfaces of the computing node and the riser card form the foregoing intra-node communication sub-channel. This is equivalent to inserting the riser card allocated to the computing node into the computing node, to implement a communication connection between the riser card and the computing node.

Further, for any computing node, a riser card inserted into the computing node may be connected to the central offload node by using a high-speed communication bus. In FIG. 2A, the high-speed communication bus is implemented by a switch that supports the high-speed communication bus. A plurality of high-speed communication bus interfaces are disposed on the switch, and are respectively connected to high-speed communication bus interfaces of a plurality of riser cards and high-speed communication bus interfaces of the central offload node. For example, when the high-speed communication bus is a PCIE bus, the switch is a PCIE switch. When the high-speed communication bus is an RDMA bus, the switch is an infiniband (IB) switch. The switch can internally implement a communication channel between the central offload node and the riser card.

FIG. 2A is a implementation of FIG. 2B. In FIG. 2B, a function of the switch may be integrated into the central offload node. In this case, a plurality of high-speed communication bus interfaces are disposed on the central offload node. Each riser card may be directly connected to a high-speed communication bus interface of the central offload node through a high-speed communication bus interface of the riser card.

The high-speed communication bus interface is, for example, a PCIE bus interface, an SERDES bus interface, a remote direct memory access over converged ethernet (RoCE) bus interface, or a remote direct memory access (RDMA) bus interface.

Furthermore, for any computing node, virtual devices are deployed on a riser card inserted into the computing node. The virtual devices are bound to a cloud instance of the computing node. Therefore, the cloud instance of the computing node may communicate with the central offload node through the virtual devices of the riser card inserted into the computing node. Still according to the foregoing example, as shown in FIG. 2B, in the subrack, a virtual machine 1 is deployed on the computing node 1. A virtual machine 2 is deployed on the computing node 2. A virtual device 1, a virtual device 2, and a virtual device 3 are deployed on the riser card 1. A virtual device 4 is deployed on the riser card 2. The virtual device 1, the virtual device 2, and the virtual device 3 are all bound to the virtual machine 1, and the virtual device 4 is bound to the virtual machine 2. In this case, the virtual machine 1 may communicate with the central offload node 1 through any one of the virtual device 1, the virtual device 2, and the virtual device 3, and the virtual machine 2 may communicate with the central offload node 1 through the virtual device 4.

Because the central offload node may implement communication with each computing node through a riser card inserted into the computing node, the central offload node may implement the following functions for the plurality of computing nodes.

(1) The central offload node may implement a cloud instance management function. A cloud instance running on each computing node is managed through the riser card inserted into the computing node. A management and control plane configured to manage the plurality of computing nodes is deployed on the central offload node. An employee or a tenant of a cloud vendor may input a related instruction to the management and control plane, so that the central offload node creates, releases, migrates, or monitors, through the riser card inserted into the computing node, the cloud instance running on the computing node, to manage cloud instances on the computing nodes. Still according to the foregoing example, as shown in FIG. 2B, the central offload node 1 may monitor the virtual machine 1 of the computing node 1 in real time through the virtual device 1 (which may alternatively be the virtual device 2 or the virtual device 3) of the riser card 1, to determine a running status of the virtual machine 1.

(2) The central offload node may further implement a forwarding function. As shown in FIG. 3 (which is a schematic diagram of another structure of a computing node management system), a subrack of the computing node management system further includes a network device (for example, a device such as a router or a switch) configured to access a network. The central offload node is connected to the network device. When a cloud instance of a computing node communicates with an external network, a corresponding network packet may be generated first, and the network packet is sent to the central offload node through a riser card inserted into the computing node. Then, the central offload node sends the network packet to the network device, so that the network device sends the network packet to the external network for processing. Still according to the foregoing example, as shown in FIG. 2B, it is assumed that the subrack further includes a network device 1. The virtual machine 1 may send a network packet to the central offload node 1 through the virtual device 1. Then, the central offload node 1 may forward the network packet to the network device 1, so that the network device 1 sends the network packet to an external network for processing.

Further, in the computing node management system, different subracks are usually similar in composition (for example, the subracks all include computing nodes, central offload nodes, and network devices), and communication connections may be established between the network devices of different subracks. Therefore, the network devices and the central offload nodes of different subracks may be configured to forward network packets between cloud instances of the computing nodes in different subracks, so that communication can also be implemented between these cloud instances. Still according to the foregoing example, as shown in FIG. 2B and FIG. 3, the subrack includes the computing node 1 into which the riser card 1 is inserted, the central offload node 1, and the network device 1. It is assumed that another subrack includes a computing node 7 into which a riser card 7 is inserted, a central offload node 2, and a network device 2. In this case, when the virtual machine 1 of the computing node 1 communicates with the virtual machine 7 of the computing node 7, a network packet may be sent to the central offload node 1 through the virtual device 1. Then, the central offload node 1 sends the network packet to the network device 1, so that the network device 1 sends the network packet to the network device 2. Then, the network device 2 may send the network packet to the central offload node 2, so that the central offload node 2 sends, through the virtual device 7 of the riser card 7, the network packet to the virtual machine 7 for processing.

Furthermore, in a subrack, the central offload node may be further configured to forward network packets between cloud instances of different computing nodes in the subrack, so that communication can also be implemented between the cloud instances of the different computing nodes in the subrack. Still according to the foregoing example, as shown in FIG. 2B, in the subrack, when the virtual machine 1 of the computing node 1 communicates with the virtual machine 2 of the computing node 2, the virtual machine 1 may send a network packet to the central offload node 1 through the virtual device 1. Then, the central offload node 1 sends the network packet to the virtual device 4, so that the virtual device 4 sends the network packet to the virtual machine 2 for processing.

(3) The central offload node may further implement a cloud storage function. A subrack of the computing node management system further includes a storage device configured to store data (for example, a device on which an elastic volume service disk is deployed, such as a server, a hard disk, and a disk). The central offload node is connected to the storage device. When a cloud instance of a computing node writes data to the storage device (or read data from the storage device), a corresponding IO request may be generated first, and the IO request is sent to the central offload node through a riser card inserted into the computing node. Then, the central offload node sends the IO request to the storage device, so that the storage device writes data (or reads data) based on the IO request.

Further, the central offload node is connected to a storage resource and a network resource, and may also be connected to a resource such as a computing resource. The storage resource may be at least one physical function (PF) and a plurality of virtual functions (VFs) that are created by the foregoing storage device based on an SRIVO function. The network resource may be at least one PF and a plurality of VFs that are created by the foregoing network device based on the SRIVO function. The computing resource may be at least one PF and a plurality of VFs that are created, based on the SRIVO function, by a computing device configured for heterogeneous computing, such as a GPU or a TPU that is configured for image rendering or machine learning, an FPGA, an encryption card, a decryption card, a USB device, or the like that implements a specific function. In this case, the central offload node may allocate a part of these resources to some virtual devices of a specific riser card through an inter-node communication sub-channel. After accessing these virtual devices through an intra-node communication sub-channel, a cloud instance bound to these virtual devices may use the resources allocated to these virtual devices. Still according to the foregoing example, as shown in FIG. 2B, in the subrack, the central offload node 1 is connected to the network device 1, and is also connected to a storage device 1 and a computing device 1. The network device 1, the storage device 1, and the computing device 1 have a plurality of VFs. The central offload node 1 may allocate a part of the VFs of the network device 1 to the virtual device 1 through an inter-node communication sub-channel 1 between the central offload node 1 and the riser card 1. The central offload node 1 may also allocate a part of the VFs of the storage device 1 to the virtual device 2 through the inter-node communication sub-channel 1. The central offload node 1 may further allocate a part of the VFs of the computing device 1 to the virtual device 3 through the inter-node communication sub-channel 1. Therefore, the virtual machine 1 may access the virtual device 1 through an intra-node communication sub-channel 1 between the computing node 1 and the riser card 1, to use the VFs of the network device 1. The virtual machine 1 may also access the virtual device 2 through the intra-node communication sub-channel 1, to use the VFs of the storage device 1. The virtual machine 1 may further access the virtual device 3 through the intra-node communication sub-channel 1, to use the VFs of the computing device 1.

(4) The central offload node may further implement an information processing function. The central offload node may perform processing on information to be forwarded (for example, the foregoing IO request or the network packet), and then forward the processed information. The processing performed by the central offload node includes at least one of the following: data encryption and decryption, data verification, data transmission speed control, data quality-of-service control, and the like. Data encryption and decryption means that the central offload node may use some encryption and decryption algorithms (for example, a one-way hash algorithm and a symmetric encryption algorithm) to encrypt and decrypt the forwarded information, to improve security and reliability of information transmission. Data verification means that the central offload node may further perform data integrity field (DIF) verification and error correction based on an erasure code (EC) algorithm on the information, to further improve security and reliability of information transmission. Data transmission speed control means that the central offload node may control a speed of information transmission through a manner of hardware acceleration or the like, to ensure end-to-end communication quality. Data quality-of-service control means that the central offload node may control forwarding quality of the information by using various basic technologies, to provide better quality of service (QoS) for an entire computing node management system. In addition, the central offload node may further implement various other processing. Details are not described herein.

It should be understood that in the example shown in FIG. 2B, the central offload node 1 may further allocate a part of the VFs of the network device 1 (which may also be a part of the VFs of the computing device 1, or may further be a part of the VFs of the storage device 1) to the virtual device 4 through an inter-node communication sub-channel 2 between the central offload node 1 and the riser card 2, so that the virtual machine 2 of the computing node 2 can access the virtual device 4 through an intra-node communication sub-channel 2 between the computing node 2 and the riser card 2, to use the VFs of the network device 1 (which may also be the VFs of the computing device 1, or may further be the VFs of the storage device 1).

It should be understood that in the example shown in FIG. 3, the example in which each subrack includes one central offload node is merely used for schematic description, and a quantity of the central offload node included in the subrack is not limited. The quantity of the central offload nodes in the subrack may be determined by a quantity and capacity of the computing nodes in the subrack.

Figure 4:
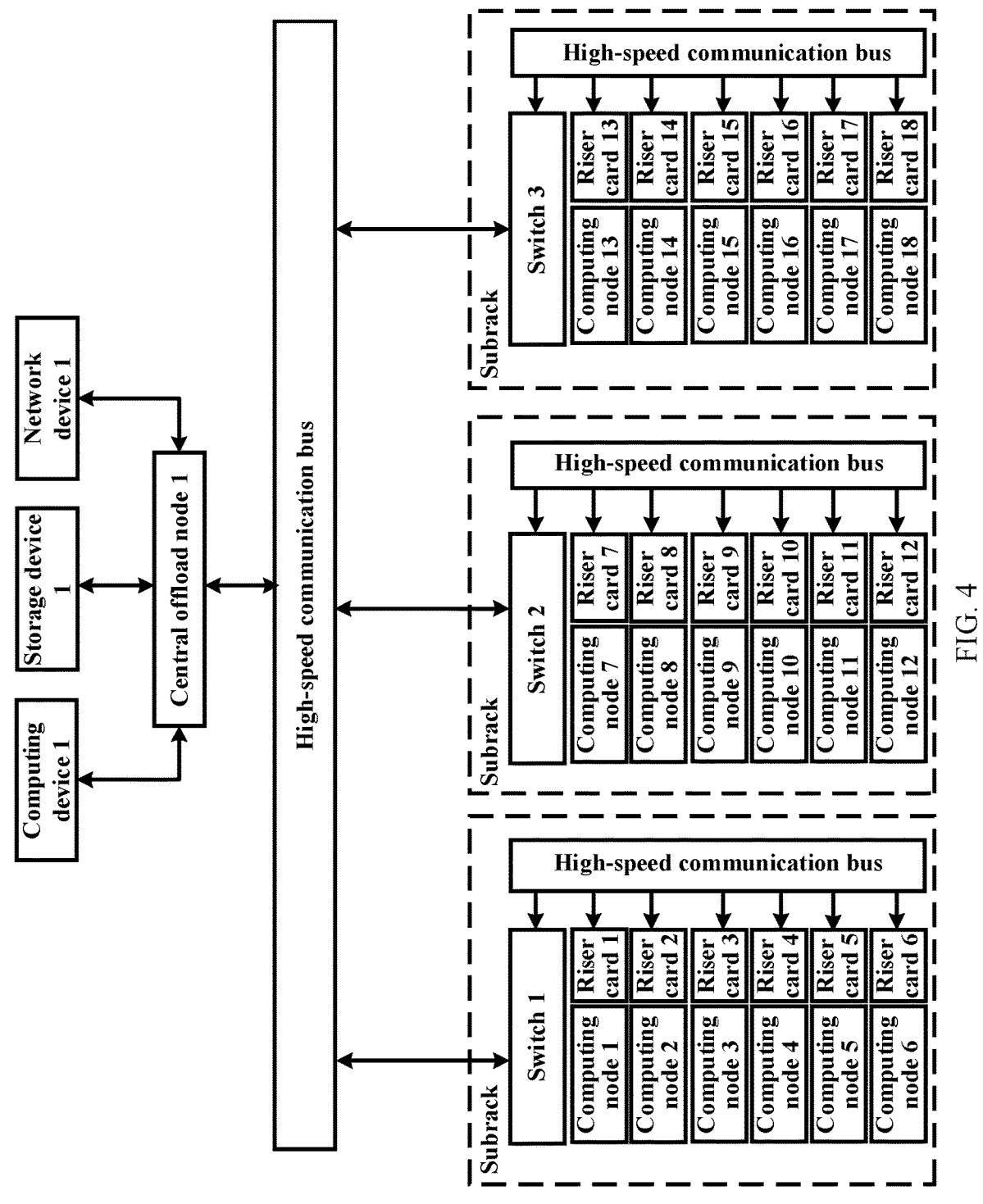
FIG. 4 is a schematic diagram of another structure of a computing node management system.

It should be further understood that in the example shown in FIG. 3, the example in which each subrack includes the central offload node is merely used for schematic description. As shown in FIG. 4 (which is a schematic diagram of another structure of a computing node management system), computing nodes in a plurality of subracks may also be managed by a same central offload node. The central offload node may communicate with the computing nodes in the subracks through a high-speed communication bus. It should be noted that in FIG. 4, for any subrack, a computing node in the subrack may access the high-speed communication bus through a switch, to implement communication with the central offload node and computing nodes in other subracks. A type of the switch corresponds to a type of the high-speed communication bus. For example, when the high-speed communication bus is a PCIE bus, the switch is a PCIE switch. For another example, when the high-speed communication bus is an RDMA bus, the switch is an IB switch or the like.

The computing node management system includes the central offload node and the plurality of computing nodes. The riser card is inserted into each computing node. Each riser card is connected to the central offload node. Each riser card establishes the communication channel between the central offload node and the computing node into which the riser card is inserted. For any computing node, the central offload node may provide resources for the computing node and manage the computing node through a riser card inserted into the computing node. It can be learned that a cloud management function is implemented by the central offload node, and the riser cards implements an information transfer function. Therefore, when load on different computing nodes is different, even if resource specifications of riser cards inserted into the different computing nodes are the same, functions that are implemented by the riser cards can be fully supported. A cloud vendor does not need to design riser cards of different resource specifications for the different computing nodes, and this helps reduce costs.

Further, if each subrack includes at least two central offload nodes, different central offload nodes in a same subrack may support a load balancing function, an active/standby function, or the like, to improve stability and reliability of the computing node management system.

Further, the riser card provided by cloud vendors supports computing nodes (physical servers) provided by different vendors. That is, the riser cards can be installed on any computing node that supports PCIE interfaces, making the deployment of the computing node management system more convenient and flexible.

Further, cloud instances of computing nodes are managed by the central offload node. The cloud instances may be flexibly switched between a virtual machine, a container, and a bare metal based on actual requirements, to meet requirements of different users.

Further, deployment of the central offload node is not limited by a single subrack (which may refer to the example shown in FIG. 4), and is more flexible, and resource utilization is higher.

Figure 5:
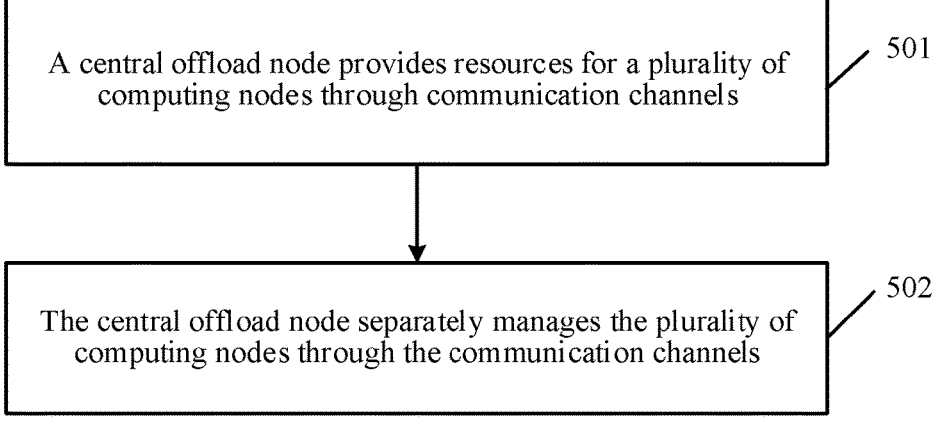
FIG. 5 is a schematic flowchart of a method for managing a plurality of computing nodes.

The foregoing describes in detail an architecture of the computing node management system. The following describes the method for managing a plurality of computing nodes. FIG. 5 is a schematic flowchart of a method for managing a plurality of computing nodes. As shown in FIG. 5, the method is applied to a central offload node. A riser card is inserted into each of the plurality of computing nodes. Each riser card is connected to the central offload node. Each riser card establishes a communication channel between the central offload node and the computing node into which the riser card is inserted. It should be noted that for a computing node management system, refer to the example shown in FIG. 3 or FIG. 4. Details are not described again subsequently.

The method includes:

501. The central offload node provides resources for the plurality of computing nodes through the communication channels. It should be noted that for step 501, reference may be made to the foregoing related descriptions of the forwarding function, the cloud storage function, and the information processing function of the central offload node. Details are not described herein again.

502. The central offload node separately manages the plurality of computing nodes through the communication channels. It should be noted that for step 502, reference may be made to the foregoing related description of the cloud instance management function of the central offload node. Details are not described herein again.

the central offload node may separately manage, through the communication channels, the plurality of computing nodes to which the resources in step 501 are allocated.

It should be noted that content about, for example, information exchange and execution processes between the modules/units in the foregoing method is based on a same concept as the system, and can bring the same technical effects as those brought by the system.

Figure 6:
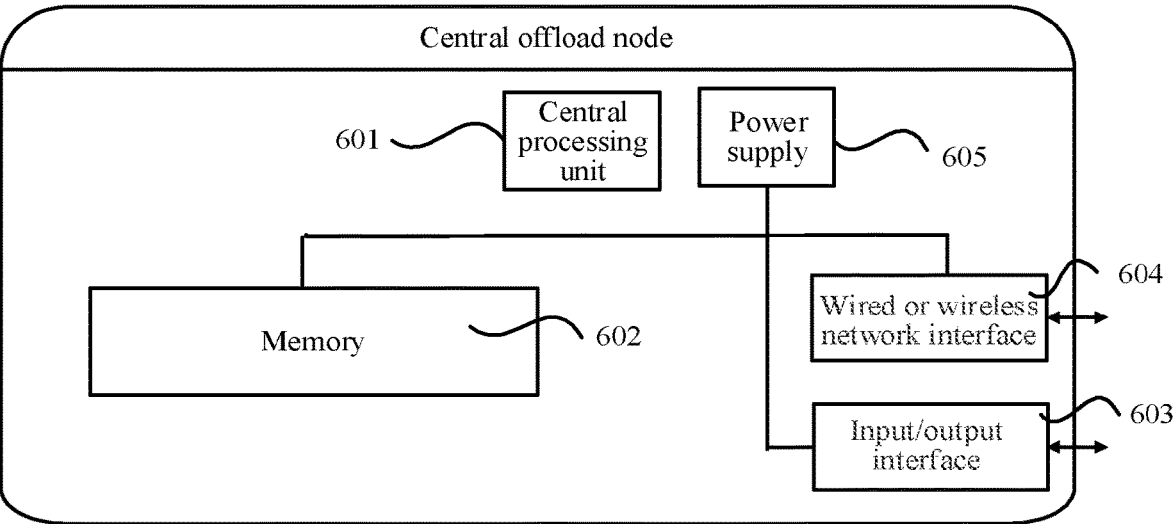
FIG. 6 is a schematic diagram of a structure of a central offload node.

FIG. 6 is a schematic diagram of a structure of a central offload node. As shown in FIG. 6, an embodiment of the central offload node may include one or more central processing units 601, memories 602, input/output interfaces 603, wired or wireless network interfaces 604, and power supplies 605.

The memory 602 may be a transient storage or persistent storage. Furthermore, the central processing unit 601 may be configured to communicate with the memory 602, and perform, on the central offload node, a series of instruction operations in the memory 602.

In this embodiment, the central processing unit 601 may perform steps that can be implemented by the central offload node in the foregoing embodiment shown in FIG. 3 or FIG. 4. Details are not described herein again.

Figure 7:
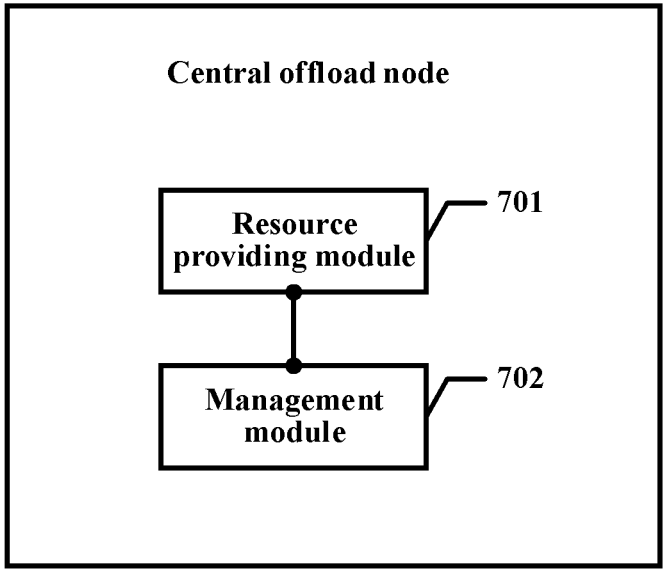
FIG. 7 is a schematic diagram of another structure of a central offload node.

FIG. 7 is a schematic diagram of another structure of a central offload node. As shown in FIG. 7, the central offload node includes:

a resource providing module 701, configured to provide resources for a plurality of computing nodes through communication channels, where the resource providing module 701 may, for example, be configured to implement step 501 in the embodiment shown in FIG. 5; and a management module 702, configured to separately manage the plurality of computing nodes through the communication channels, where the management module 702 may, for example, be configured to implement step 502 in the embodiment shown in FIG. 5.

This disclosure further relates to a computer storage medium, including computer-readable instructions. When the computer-readable instructions are executed, the foregoing method for managing a plurality of computing nodes is implemented.

This disclosure further relates to a computer program product that includes instructions. When the computer program product is run on a computer, the computer is enabled to perform the foregoing method for managing a plurality of computing nodes.

It may be clearly understood by a person skilled in the art that for convenient and brief description, for a detailed working process of the foregoing system, apparatus, and unit, refer to a corresponding process in the foregoing method embodiments, and details are not described herein again.

It should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a computer-readable storage medium. Based on such an understanding, the technical solutions of this disclosure essentially, or the part contributing to conventional technologies, or all or some of the technical solutions may be implemented in the form of a software product. The computer software product is stored in a storage medium and includes several instructions for enabling a computer device (which may be a personal computer, a server, a network device, or the like) to perform all or some of the steps of the methods in embodiments of this disclosure. The foregoing storage medium includes: any medium that can store program code, such as a USB flash drive, a removable hard disk, a read-only memory (ROM), a random-access memory (RAM), a magnetic disk, or an optical disc.

What is claimed is:

1. A system comprising:
a central offload node;
a plurality of riser cards; and
a plurality of computing nodes,
wherein a first riser card of the plurality of riser cards is inserted into a first computing node of the plurality of computing nodes, and the first riser card is connected to the central offload node,
wherein a first inter-node communication sub-channel is established between the first riser card and the central offload node,
wherein a first intra-node communication sub-channel is established between the first riser card and the computing node into which the first riser card is inserted,
wherein the central offload node is connected to a storage device that provides a first storage resource,
wherein a first virtual device is deployed on the first riser card of the plurality of riser cards,
wherein a first cloud instance in a first computing node into which the first riser card is inserted is bound to the first virtual device,
wherein the central offload node allocates, to the first virtual device through the first inter-node communication sub-channel, the first storage resource of the storage device connected to the central offload node,
wherein the first cloud instance accesses, through the first intra-node communication sub-channel, the first virtual device to which the first storage resource is allocated, and
wherein the central offload node is further configured to forward an input/output (I/O) request between the storage device and the first cloud instance.

2. The system of claim 1, wherein the central offload node is further configured to perform processing on the I/O request, and wherein the processing comprises at least one of data encryption and decryption, data verification, data transmission speed control, or data quality-of-service control.

3. The system of claim 1, wherein a second riser card in the plurality of riser cards is inserted into a second computing node of plurality of computing nodes, and the second riser card is connected to the central offload node, wherein a second inter-node communication sub-channel is established between the second riser card of the plurality of riser cards and the central offload node, wherein a first intra-node communication sub-channel is established between the second riser card and the computing node into which the second riser card is inserted, wherein the central offload node is connected to a computing device that provides a computing resource, wherein a second virtual device is deployed on the second riser card of the plurality of riser cards, wherein a second cloud instance in the second computing node of the plurality of computing nodes into which the second riser card is inserted is bound to the second virtual device, wherein the central offload node allocates, to the second virtual device through the second inter-node communication sub-channel, the computing resource of the computing device connected to the central offload node, and wherein the second cloud instance accesses, through the second intra-node communication sub-channel, the second virtual device to which the computing resource is allocated.

4. The system of claim 3, wherein the computing device is a processor configured for heterogeneous computing.

5. The system of claim 1, wherein a third riser card in the plurality of riser cards is inserted into a third computing node of plurality of computing nodes, and the third riser card is connected to the central offload node, wherein a third inter-node communication sub-channel is established between the third riser card of the plurality of riser cards and the central offload node, wherein a third intra-node communication sub-channel is established between the third riser card and the computing node into which the third riser card is inserted, wherein the central offload node is connected to a network device that provides a network resource, wherein a third virtual device is deployed on the third riser card of the plurality of riser cards, wherein a third cloud instance in a third computing node into which the third riser card is inserted is bound to the third virtual device, wherein the central offload node allocates, to the third virtual device through the third inter-node communication sub-channel, the network resource of the network device connected to the central offload node, and wherein the third cloud instance accesses, through the third intra-node communication sub-channel, the third virtual device to which the network resource is allocated.

6. The system of claim 5, wherein the central offload node is further configured to forward a network packet between the network device and the third cloud instance.

7. The system of claim 5, wherein the central offload node is further configured to forward network packets between cloud instances in the computing nodes.

8. The system of claim 1, wherein the first riser card is further configured to establish the first inter-node communication sub-channel using a high-speed communication bus, and wherein the high-speed communication bus is a Peripheral Component Interconnect Express (PCIE) bus, a serializer/deserializer (SERDES) bus, a remote direct memory access (RDMA) bus, and a RDMA over converged ethernet (RoCE) bus.

9. The system of claim 1, wherein the first riser card is further configured to establish the first intra-node communication sub-channel using a Peripheral Component Interconnect Express (PCIE) bus.

10. The system of claim 1, wherein the computing nodes are disposed in a same subrack.

11. The system of claim 1, wherein the computing nodes comprise groups of computing nodes, and wherein each group of the computing nodes is disposed in a same subrack.

12. The system of claim 1, wherein the central offload node is a server.

13. The system of claim 1, wherein the central offload node is an offload card.

14. The system of claim 1, wherein the first virtual device is a virtual function (VF) device.

15. The system of claim 1, wherein the first virtual device is a physical function (PF) device.

16. The system of claim 1, wherein the first riser card supports a single-root input/output (I/O) virtualization (SRIOV) function.

17. The system of claim 1, wherein the first riser card is further configured to create the first virtual device based on a virtio protocol.

18. The system of claim 1, wherein a second riser card in the plurality of riser cards is inserted into a second computing node of plurality of computing nodes, and the second riser card is connected to the central offload node, wherein a second inter-node communication sub-channel is established between the second riser card of the plurality of riser cards and the central offload node, wherein a second intra-node communication sub-channel is established between the second riser card and the computing node into which the second riser card is inserted, wherein the storage device provides a second storage resource, wherein a second virtual device is deployed on the second riser card of the plurality of riser cards, wherein a second cloud instance in the second computing node of the plurality of computing nodes into which the second riser card is inserted is bound to the second virtual device, wherein the central offload node allocates, to the second virtual device through the second inter-node communication sub-channel, the second storage resource of the storage device connected to the central offload node, and wherein the second cloud instance accesses, through the second intra-node communication sub-channel, the second virtual device to which the second storage resource is allocated.

19. The system of claim 18, wherein the second riser card is further configured to create the second virtual device based on a virtio protocol.

20. The system of claim 1, wherein the central offload node is of at least two central offload nodes of the system, and wherein a quantity of the at least two central offload nodes for the plurality of computing nodes is adjustable.

* * * * *